US010074452B2

(12) United States Patent
Kobayashi et al.

(10) Patent No.: US 10,074,452 B2
(45) Date of Patent: Sep. 11, 2018

(54) COPPER ALLOY ELEMENT WIRE, COPPER ALLOY STRANDED WIRE, AND AUTOMOTIVE ELECTRIC WIRE

(71) Applicants: Autonetworks Technologies, Ltd., Yokkaichi, Mie (JP); Sumitomo Wiring Systems, Ltd., Yokkaichi, Mie (JP); Sumitomo Electric Industries, Ltd., Osaka-shi, Osaka (JP)

(72) Inventors: Hiroyuki Kobayashi, Mie (JP); Akiko Inoue, Osaka (JP)

(73) Assignees: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/304,367

(22) PCT Filed: Mar. 25, 2015

(86) PCT No.: PCT/JP2015/059128
§ 371 (c)(1),
(2) Date: Oct. 14, 2016

(87) PCT Pub. No.: WO2015/159671
PCT Pub. Date: Oct. 22, 2015

(65) Prior Publication Data

US 2017/0040081 A1 Feb. 9, 2017

(30) Foreign Application Priority Data

Apr. 14, 2014 (JP) ................................ 2014-082664

(51) Int. Cl.
*H01R 9/05* (2006.01)
*H02G 15/04* (2006.01)
(Continued)

(52) U.S. Cl.
CPC ............... *H01B 1/026* (2013.01); *C22C 9/00* (2013.01); *C22C 9/02* (2013.01); *C22C 9/04* (2013.01); *H01B 7/02* (2013.01); *C22F 1/08* (2013.01)

(58) Field of Classification Search
CPC .............. B22D 11/004; B22D 11/0602; B22D 11/0605; B22D 11/1206; C22C 9/00;
(Continued)

(56) References Cited

U.S. PATENT DOCUMENTS 4,038,743 A * 8/1977 DuRocher .............. H01R 4/026 219/95
5,149,917 A 9/1992 Sawada
(Continued)

FOREIGN PATENT DOCUMENTS

CN 101489702 A 7/2009
CN 101522926 A 9/2009
(Continued)

OTHER PUBLICATIONS

International Preliminary Report on Patentability for Application No. PCT/JP2015/059128 dated Jan. 26, 2016, 20 Pages.
(Continued)

*Primary Examiner* — Timothy Thompson
*Assistant Examiner* — Guillermo Egoavil
(74) *Attorney, Agent, or Firm* — Reising Ethington, P.C.

(57) ABSTRACT

A copper alloy element wire 1 has a chemical composition including: 0.45 mass % or more and 2.0 mass % or less, in total, of at least one additive element selected from the group consisting of Fe, Ti, Sn, Ag, Mg, Zn, Cr and P; in mass ppm,
(Continued)

10 ppm or less of H content, and the balance being Cu and unavoidable impurities. A copper alloy stranded wire 2 includes a plurality of the copper alloy element wires 1 twisted together. An automotive electric wire 5 includes the copper alloy stranded wire 2 and an insulator 3 that covers the outer periphery of the copper alloy stranded wire 2.

20 Claims, 2 Drawing Sheets

(51) Int. Cl.

| | |
|---|---|
| ***H02G 15/013*** | (2006.01) |
| ***H01B 1/02*** | (2006.01) |
| ***C22C 9/00*** | (2006.01) |
| ***C22C 9/02*** | (2006.01) |
| ***C22C 9/04*** | (2006.01) |
| ***H01B 7/02*** | (2006.01) |
| *C22F 1/08* | (2006.01) |

(58) Field of Classification Search

CPC ..... C22C 9/02; C22C 9/04; C22C 9/06; C22F 1/08; H01B 1/026; H01B 7/02; H01B 1/02

USPC ....... 174/74 R; 148/411, 412, 413, 414, 554; 420/473

See application file for complete search history.

(56) References Cited

U.S. PATENT DOCUMENTS

| | | | | |
|---|---|---|---|---|
| 6,344,171 | B1 | 2/2002 | Nomura | |
| 8,624,119 | B2 | 1/2014 | Takahashi | |
| 2002/0066503 | A1* | 6/2002 | Matsui | C22F 1/08 148/432 |
| 2007/0221396 | A1* | 9/2007 | Izumida | C21D 8/06 174/128.1 |
| 2009/0165902 | A1* | 7/2009 | Yoshida | B22D 11/004 148/554 |
| 2010/0072584 | A1 | 3/2010 | Aruga | |
| 2010/0189593 | A1* | 7/2010 | Maehara | C22C 9/00 420/473 |
| 2010/0294534 | A1* | 11/2010 | Mihara | C22C 9/06 174/126.1 |
| 2012/0018192 | A1* | 1/2012 | Takahashi | C22C 9/00 174/128.1 |
| 2012/0039741 | A1 | 2/2012 | Aruga | |
| 2012/0039742 | A1 | 2/2012 | Aruga | |
| 2012/0039743 | A1 | 2/2012 | Aruga | |
| 2012/0061122 | A1 | 3/2012 | Kodama | |
| 2015/0294758 | A1* | 10/2015 | Kumada | C22C 9/06 174/110 R |
| 2016/0336086 | A1* | 11/2016 | Inoue | C22C 9/00 |

FOREIGN PATENT DOCUMENTS

| | | | | |
|---|---|---|---|---|
| CN | 102356435 | A | 2/2012 | |
| JP | S59089743 | A | 5/1984 | |
| JP | H04017214 | A | 1/1992 | |
| JP | H05302155 | A | 11/1993 | |
| JP | H06187831 | A | 7/1994 | |
| JP | 2003321720 | A | 11/2003 | |
| JP | 2004003036 | A | 1/2004 | |
| JP | 2007046102 | A | 2/2007 | |
| JP | 3911184 | B2 | 5/2007 | |
| JP | 2008016284 | A | 1/2008 | |
| JP | 2008095125 | A | 4/2008 | |
| JP | 2010205549 | A * | 9/2010 | H01B 13/00 |
| JP | 2011102416 | A | 5/2011 | |
| JP | 5355865 | B2 | 11/2013 | |
| KR | 20110111502 | A | 10/2011 | |
| WO | WO2010084989 | A1 | 7/2010 | |
| WO | WO2010147018 | A1 | 12/2010 | |

OTHER PUBLICATIONS

International Search Report and Written Opinion for Application No. PCT/JP2015/059128 dated Jun. 16, 2015, 10 pages.

English Translation for International Search Report for Application No. PCT/JP2015/059128 dated Jun. 16, 2015, 3 pages.

Chinese Office Action for Application No. 201580019867.4 dated Jun. 19, 2017, 4 pages.

English Translation of Chinese Office Action for Application No. 201580019867.4 dated Jun. 19, 2017, 6 pages.

Korean Office Action for Application No. 10-2016-7031461 dated Nov. 1, 2017, 5 pages.

English Translation of Korean Office Action for Application No. 10-2016-7031461 dated Nov. 1, 2017, 4 pages.

Office Action from Chinese Patent Office for Application No. 201580019867.4 dated Apr. 2, 2018; 6 pages.

English Translation of Office Action from Chinese Patent Office for Application No. 201580019867.4 dated Apr. 2, 2018; 7 pages.

Korean Office Action for Application No. 10-2016-7031461 dated May 28, 2018; 3 pages.

English Translation of Korean Office Action for Application No. 10-2016-7031461 dated May 28, 2018; 4 pages.

English Translation of JP5355865 (B2); 29 pages.

* cited by examiner

COPPER ALLOY ELEMENT WIRE, COPPER ALLOY STRANDED WIRE, AND AUTOMOTIVE ELECTRIC WIRE

CROSS REFERENCE TO RELATED APPLICATIONS

This application claims the priority of Japanese patent application JP2014-082664 filed on Apr. 14, 2014, the entire contents of which are incorporated herein.

TECHNICAL FIELD

The present invention relates to copper alloy element wires, copper alloy stranded wires, and automotive electric wires.

BACKGROUND ART

Automotive electric wires having a conductor and an insulator that covers the outer periphery of the conductor are conventionally known. Generally known examples of the conductors include a copper alloy stranded wire formed of a plurality of copper alloy element wires twisted together. Typically, before an automotive electric wire is routed in an automobile, a portion of the insulator at a wire end portion is removed and a terminal is crimped onto an exposed portion of the conductor.

With the recent trend toward lightweight automobiles, weight reduction of automotive electric wires is desired. One known example of techniques for reducing the weight of an automotive electric wire is the technique of reducing the diameter of the conductor.

Patent Document 1 (JP-B-3911184), which was published prior to this application, discloses a technology related to a copper foil made of a copper alloy that includes, in mass ppm, 500 to 2500 ppm of Sn, 20 ppm or less of oxygen, 2 ppm or less of hydrogen, and the balance Cu and unavoidable impurities.

SUMMARY OF THE INVENTION

However, diameter reduction of a conductor as described above involves reducing the element wire diameter of each of copper alloy element wires. Thus, conventional automotive electric wires having a reduced diameter pose a problem in that the strength of the conductor tends to be insufficient and further the crimp strength onto a terminal tends to decrease. It should be noted that the technology of Patent Document 1 is a technology related to foils and therefore is difficult to apply as it is to automotive electric wires.

The present design has been made in view of the above circumstances and therefore provides copper alloy element wires and copper alloy stranded wires that realize automotive electric wires having high conductor strength and exhibiting excellent crimp strength of the automotive electric wire and a terminal and also provides automotive electric wires including the copper alloy element wires or the copper alloy stranded wires.

The present inventors conducted a variety of studies on the problem described above. Consequently, they have made the following finding. Copper alloy element wires having a reduced element wire diameter can be greatly influenced by H-induced intergranular cracking when the H content in the copper alloy is excessively high. As a result, the automotive electric wire will have a reduced crimp strength of the automotive electric wire and the terminal when the terminal is crimped onto the automotive electric wire. The present design has been accomplished principally based on this finding.

One aspect of the present design is a copper alloy element wire for use as a conductor of an automotive electric wire, the copper alloy element wire having a chemical composition including: 0.45 mass % or more and 2.0 mass % or less, in total, of at least one additive element selected from the group consisting of Fe, Ti, Sn, Ag, Mg, Zn, Cr and P; in mass ppm, 10 ppm or less of H content; and the balance being Cu and unavoidable impurities.

Another aspect of the present design is a copper alloy stranded wire including a plurality of the copper alloy element wires being twisted together.

Still another aspect of the present design is an automotive electric wire including the copper alloy stranded wire and an insulator that covers an outer periphery of the copper alloy stranded wire.

The copper alloy element wire has the particular chemical composition including the particular additive elements within the specified range and in which the H content is intentionally limited to the specified range. Therefore, the copper alloy element wire is less likely to experience H-induced intergranular cracking when used to form a copper alloy stranded wire by twisting together a plurality of the copper alloy element wires and the copper alloy stranded wire is used as a conductor. Accordingly, the copper alloy element wire realizes an automotive electric wire having high conductor strength and exhibiting excellent crimp strength of the automotive electric wire and a terminal.

The copper alloy stranded wire includes a plurality of the copper alloy element wires having the particular chemical composition and being twisted together. Accordingly, the copper alloy stranded wire realizes an automotive electric wire having high conductor strength and exhibiting excellent crimp strength of the automotive electric wire and a terminal.

The automotive electric wire includes the copper alloy stranded wire and an insulator that covers the outer periphery of the copper alloy stranded wire. Accordingly, the automotive electric wire has high conductor strength and exhibiting excellent crimp strength of the automotive electric wire and a terminal when the terminal is crimped onto the automotive electric wire.

Figure 1:
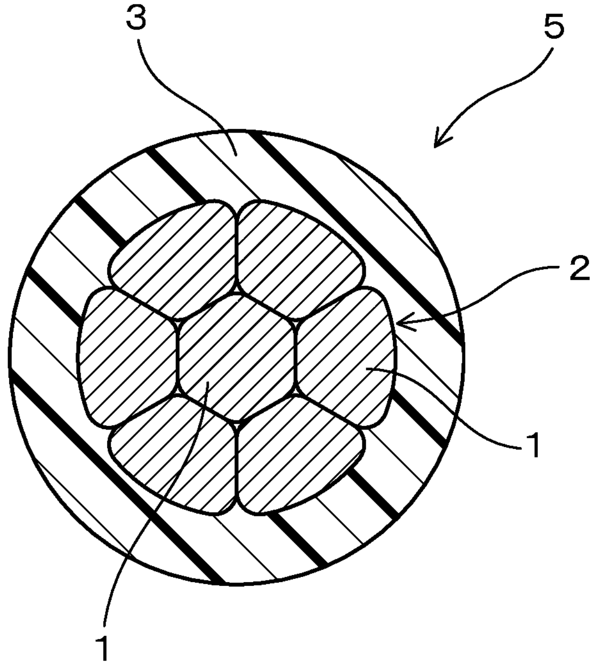
FIG. 1 is an illustration of a configuration of an automotive electric wire in Example 1.

The reasons for the chemical composition of the copper alloy element wire will be described.

At least one additive element selected from the group consisting of Fe, Ti, Sn, Ag, Mg, Zn, Cr and P: 0.45 mass % or more and 2.0 mass % or less in total.

These additive elements are effective in increasing the strength of copper alloy element wires. These additive elements need to be included in an amount of 0.45 mass % or more in total in order to produce their advantageous effects. In view of balance between the strength and the electrical conductivity and for other reasons, the additive elements are preferably included in an amount of not less than 0.5 mass % in total and more preferably not less than 0.8 mass % in total. On the other hand, if the additive elements are included in an excessive amount, the wire drawability and the electrical conductivity will decrease. For this reason, the amount of the additive elements needs to be limited to not more than 2.0 mass % in total. In view of balance between the strength and the electrical conductivity and for other reasons, the additive elements are preferably included in an amount of not more than 1.7 mass % in total and more preferably not more than 1.6 mass % in total. Among the additive elements, Fe, Ti, Sn, Mg, and Cr are highly effective in increasing the strength when added and therefore are useful.

H content: 10 ppm or less in mass ppm

The H (hydrogen) content is highly related to crimp strengths of automotive electric wires and the terminal. Copper alloy element wires having a reduced element wire diameter can be greatly influenced by H-induced intergranular cracking if the H content in the copper alloy is excessively high and this will result in reduced crimp strength of the automotive electric wire and the terminal. In particular, when the element wire diameter of copper alloy element wires used for formation of a copper alloy stranded wire is not more than 0.3 mm, the influence of intergranular cracking will markedly increase.

In order to ensure a sufficient crimp strength of the automotive electric wire and the terminal, the H content needs to be limited to not more than 10 ppm in mass ppm. For the purpose of ensuring a sufficient crimp strength of the automotive electric wire and the terminal and improving formability in the process from casting through wire drawing or wire stranding as well as for other reasons, the H content may be preferably limited to not more than 5 ppm in mass ppm, and more preferably to 2 ppm or less in mass ppm. For the purposes described above, it is desirable that the H content be as low as possible. However, complete elimination of H is difficult in actual production. Accordingly, although the chemical composition described above contains H, the limitation of the H content to 10 ppm or less in mass ppm suffices.

In the chemical composition, the O (oxygen) content is preferably limited to 20 ppm or less in mass ppm. By limiting the O content to be within this range, it is possible to inhibit formation of oxides with the additive elements, such as titanium oxide ($TiO_2$) or tin oxide ($SnO_2$), for example. As a result, a decrease in wire drawability and a decrease in strength are inhibited more easily. The O content is more preferably not more than 15 ppm in mass ppm and even more preferably not more than 10 ppm in mass ppm.

A tensile strength of the copper alloy element wire is suitably 400 MPa or more. This facilitates realization of an automotive electric wire having high conductor strength and exhibiting excellent crimp strength of the automotive electric wire and the terminal even when the automotive electric wire including the copper alloy element wires has a reduced conductor cross-sectional area. The tensile strength may preferably be not less than 450 MPa, more preferably not less than 500 MPa, still more preferably not less than 540 MPa, even more preferably not less than 550 MPa, and still even more preferably not less than 570 MPa. Furthermore, the tensile strength may preferably be not more than 600 MPa in view of balance with the electrical conductivity and for other reasons.

An element wire elongation of the copper alloy element wire is suitably 5% or more. This facilitates realization of an automotive electric wire having high conductor strength and high conductor elongation as well as excellent crimp strength of the automotive electric wire and the terminal even when the automotive electric wire including the copper alloy element wires has a reduced conductor cross-sectional area. The element wire elongation may more preferably be not less than 7%. Furthermore, the element wire elongation may preferably be not more than 15% in view of balance with the conductor strength.

An electrical conductivity of the copper alloy element wire is suitably 62% IACS or more. This facilitates realization of an automotive electric wire having well balanced conductor strength and electrical conductivity properties as well as excellent crimp strength of the automotive electric wire and the terminal even when the automotive electric wire including the copper alloy element wires has a reduced conductor cross-sectional area. Furthermore, this automotive electric wire may be suitably used as a signal line. The electrical conductivity may more preferably be not less than 70% IACS. Furthermore, the electrical conductivity may preferably be not more than 80% IACS in view of balance with the conductor strength.

An element wire diameter of the copper alloy element wire is suitably 0.3 mm or less. This enables relatively easy reduction of the stranded wire cross-sectional areas of copper alloy stranded wires including a plurality of the copper alloy element wires twisted together. In addition, with this element wire diameter, the above-described functions and advantages obtained by employing the chemical composition are provided sufficiently. The element wire diameter may preferably be not more than 0.25 mm and more preferably not more than 0.20 mm for the purpose of diameter reduction and weight reduction and for other reasons. Furthermore, the element wire diameter may preferably be not less than 0.10 mm for the purpose of ensuring sufficient strength of the copper alloy stranded wire and facilitating production of the copper alloy element wire as well as for other reasons.

The copper alloy stranded wire may include a plurality of copper alloy element wires that are merely twisted together, or may include a plurality of copper alloy element wires that are twisted together and then compressed in a radial direction of the stranded wire. In the latter case, the diameter of the stranded wire can be further reduced.

A stranded wire cross-sectional area of the copper alloy stranded wire is suitably 0.22 $mm^2$ or less. With this stranded wire cross-sectional area, the above-described functions and advantages obtained by employing the chemical composition are provided sufficiently. The stranded wire cross-sectional area may preferably be not more than 0.17 $mm^2$ and more preferably not more than 0.13 $mm^2$ for the purpose of diameter reduction and weight reduction. Furthermore, the stranded wire cross-sectional area may preferably be not less than 0.05 $mm^2$ and more preferably not less than 0.08 $mm^2$ for the purpose of ensuring sufficient strength of the copper alloy stranded wire and facilitating production of the copper alloy stranded wire as well as for other reasons.

A tensile strength of the copper alloy stranded wire is suitably 400 MPa or more. This facilitates realization of an automotive electric wire having high conductor strength and exhibiting excellent crimp strength of the automotive electric wire and the terminal even when the automotive electric wire including the copper alloy stranded wire has a reduced conductor cross-sectional area. The tensile strength may preferably be not less than 450 MPa, more preferably not less than 500 MPa, still more preferably not less than 540 MPa, even more preferably not less than 550 MPa, and still even more preferably not less than 570 MPa. Furthermore, the tensile strength may be not more than 600 MPa in view of balance with the electrical conductivity and for other reasons.

A total elongation of the copper alloy stranded wire suitably is suitably 5% or more. This facilitates realization of an automotive electric wire having high conductor strength and high conductor elongation as well as excellent crimp strength of the automotive electric wire and the terminal even when the automotive electric wire including the copper alloy stranded wire has a reduced conductor cross-sectional area. The total elongation may more preferably be not less than 10%. Furthermore, the total elongation may preferably be not more than 15% in view of balance with the conductor strength and for other reasons.

An electrical conductivity of the copper alloy stranded wire is suitably 62% IACS or more. This facilitates realization of an automotive electric wire having well balanced conductor strength and electrical conductivity properties as well as excellent crimp strength of the automotive electric wire and the terminal even when the automotive electric wire including the copper alloy stranded wire has a reduced conductor cross-sectional area. Furthermore, this automotive electric wire may be suitably used as a signal line. The electrical conductivity may more preferably be not less than 70% IACS. Furthermore, the electrical conductivity may preferably be not more than 80% IACS in view of balance with the conductor strength.

The automotive electric wire includes an insulator on the outer periphery of the copper alloy stranded wire. The insulator may be made of an electrically insulating polymer-based resin composition such as a variety of plastics and rubbers (including elastomers). One plastic or rubber may be used alone or two or more different plastics or rubbers may be used in combination. Specific examples of the polymer include a vinyl chloride resin, a polyolefin resin, and a polysulfone resin. The insulator may be formed of one layer or of two or more layers. The thickness of the insulator may be within a range of 0.1 mm to 0.4 mm, for example. The insulator may contain one or more of a variety of additives that can be generally used in an electrical cable. Specific examples of the additives include a filler, a flame retardant, an antioxidant, an anti-aging agent, a lubricant, a plasticizer, a copper inhibitor, and a pigment.

The automotive electric wire may include a terminal crimped onto a wire end portion of the automotive electric wire. In such a case, exhibits high conductor strength, and a crimp strength of the automotive electric wire and the terminal is excellent. Thus, when the automotive electric wire is applied for a wire harness, the resulting wire harness has high connection reliability while it is lightweight. Specifically, the crimp strength of the automotive electric wire and a terminal is suitably 51 N or more. This enhances the functions and advantages described above. The crimp strength of the automotive electric wire and the terminal may preferably be not less than 55 N or more, more preferably 60 N or more, and still more preferably 70 N or more.

The copper alloy element wire and the copper alloy stranded wire may suitably be produced in the following manner for example.

Firstly, a cast material having the above-mentioned chemical composition is formed. In this step, for example, electrolytic copper and a parent alloy including copper and additive elements are melted, and a reducing gas or a reducing agent such as wood is added thereto to produce an oxygen-free molten copper aimed at the above-described chemical composition, and subsequently the molten copper is cast. The parent alloy may be an alloy in which the H content is appropriately reduced.

For the casting, any casting technique may be employed, examples of which include continuous casting using a movable mold or a frame-shaped stationary mold and mold casting using a box-shaped stationary mold. With continuous casting particularly, the molten alloy can be rapidly solidified so that the additive elements can be held in solid solution. Thus, continuous casting is advantageous in that the subsequent solution treatment can be omitted.

The resultant cast material is subjected to plastic working to form a wrought product. An example of the plastic working that may be employed is rolling or extruding by hot working or cold working. In the case where the cast material is produced using a method other than continuous casting, it is preferred that a solution treatment be performed before or after, or before and after, the plastic working. In the case where a solution treatment is to be performed, the treatment conditions may include, for example, holding temperatures ranging from 800° C. to 1050° C. and holding times ranging from 0.1 hours to 2 hours.

The resultant wrought product is subjected to wire drawing to form a solid wire. The wire drawing rate may be appropriately selected depending on a desired wire diameter. In this step, a plurality of the resultant solid wires may be twisted together to form a stranded wire. Furthermore, the stranded wire may be subjected to compression forming.

The resultant solid wire or stranded wire is subjected to a heat treatment. The heat treatment may be performed under conditions that enable the solid wire or stranded wire to have a tensile strength of not less than 400 MPa and an elongation of not less than 5%. The heat treatment may be performed both after wire drawing and after wire twisting. This heat treatment is a process for softening the wire to an extent such that the strength of the wire, which has been increased by refining of the crystal structure and work hardening, would not extremely decrease, and also, for increasing the toughness.

Specific conditions for the heat treatment may include holding temperatures ranging from 300° C. to 550° C. and holding times ranging from 4 hours to 16 hours, for example. The heat treatment atmosphere may be a non-oxidizing atmosphere such as a vacuum, an inert gas (e.g., nitrogen or argon), or a reducing gas (hydrogen-containing gas, carbon dioxide gas-containing gas). This makes it easier to inhibit the oxide film on the surface of the copper alloy from growing in heat during the heat treatment and therefore causing an increase in contact resistance at the terminal connecting portion. The heat treatment may be performed either in a batch manner or in a continuous manner. Examples of batch-manner heat treatments include a process of heating in a heating furnace. Examples of continuous-manner heat treatments include a conduction heating process and a high frequency induction heating process. Continuous heat treatment processes are advantageous in that properties variations in a longitudinal direction of the resultant copper alloy element wire or copper alloy stranded wire can be inhibited more easily.

The features described above may be appropriately combined as needed for the purpose of, for example, obtaining the above-described functions, advantages and the like.

EXAMPLE

Example 1

Examples of the copper alloy stranded wire and the automotive electric wire including the copper alloy stranded wire will be described together with comparative examples.

In this example, copper alloy stranded wires, each including seven copper alloy element wires having the chemical composition shown in Table 1 and being twisted together, were produced and evaluated. The copper alloy stranded wires of samples sw1 to sw7 can be used as a conductor of an automotive electric wire. Each of the copper alloy stranded wires of samples sw1 to sw7 includes seven copper alloy element wires twisted together, and the copper alloy element wires each had a chemical composition including: 0.45 mass % or more and 2.0 mass % or less, in total, of at least one additive element selected from the group consisting of Fe, Ti, Sn, Ag, Mg, Zn, Cr and P; in mass ppm, 10 ppm or less of H content; and the balance being Cu and unavoidable impurities.

On the other hand, a copper alloy stranded wire of sample sw101, which was prepared as a comparative example, includes seven copper alloy element wires each having a chemical composition in which the H content was more than 10 ppm in mass ppm.

Specifically, the copper alloy stranded wires were produced in the following manner. Electrolytic copper of 99.99% or more purity and a parent alloy including copper and additive elements and in which the H content was appropriately reduced were loaded into a high-purity carbon crucible and subjected to vacuum melting in a continuous casting machine. Thus, molten mixed metals having the chemical compositions shown in Table 1 were produced. Thereafter, the resultant molten mixed metals were continuously cast using a high-purity carbon mold to form cast materials having a circular cross-sectional shape with a diameter of 16 mm.

Then, the resultant cast materials were swaged to a diameter of 12 mm to form wrought products. In this example, the swaged wrought products were subjected to a solution treatment under conditions including a holding temperature of 950° C. and a holding time of 1 hour. Subsequently, the resultant wrought products were subjected to wire drawing to a diameter of 0.215 mm or a diameter of 0.16 mm to produce copper alloy element wires. Resultant seven copper alloy element wires of each sample were twisted together at a twist pitch of 16 mm to form stranded wires. The stranded wires were then subjected to circular compression in a radial direction of the stranded wires and thereafter to heat treatment under the conditions shown in Table 1. In this manner, the copper alloy stranded wires of samples sw1 to sw7 and sample sw101 were produced. A sample sw102 contained an excessively high amount of H content and thus could not be subjected to working after casting.

Next, a coating of polyvinyl chloride (PVC), an insulator material, was applied by extrusion to the outer periphery of each conductor formed of the resultant copper alloy stranded wire to form a coating with a thickness of 0.2 mm. In this manner, automotive electric wires of samples 1-1 to 1-7 and sample 1-101 shown in Table 2 were produced.

Figure 2:
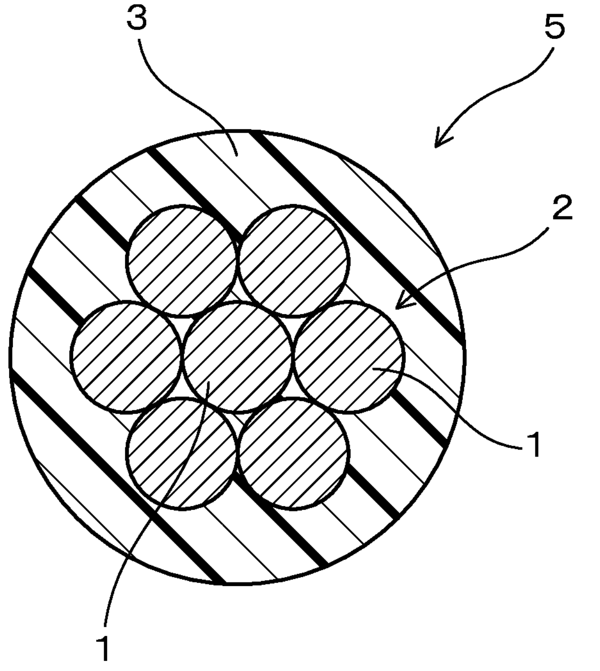
FIG. 2 is an illustration of another exemplary configuration of the automotive electric wire in Example 1.

As illustrated in FIG. 1, a resultant automotive electric wire 5 includes a copper alloy stranded wire 2 and an insulator 3 that covers the outer periphery of the copper alloy stranded wire 2. The copper alloy stranded wire 2 is formed by twisting together seven copper alloy element wires 1 and subjecting the stranded wire to circular compression in a radial direction of the stranded wire. Alternatively, the automotive electric wire 5 may have a configuration as illustrated in FIG. 2, which includes a copper alloy stranded wire 2 formed by merely twisting together seven copper alloy element wires 1 without performing compression forming and the insulator 3 that covers the outer periphery of the copper alloy stranded wire 2.

Figure 3:
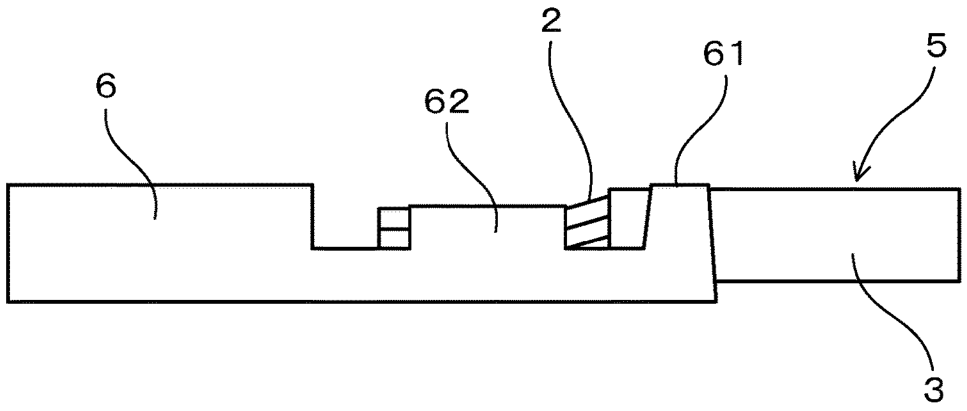
FIG. 3 is an illustration of an example of the automotive electric wire with a terminal crimped onto a wire end portion of the automotive electric wire in Example 1.
Figure 4:
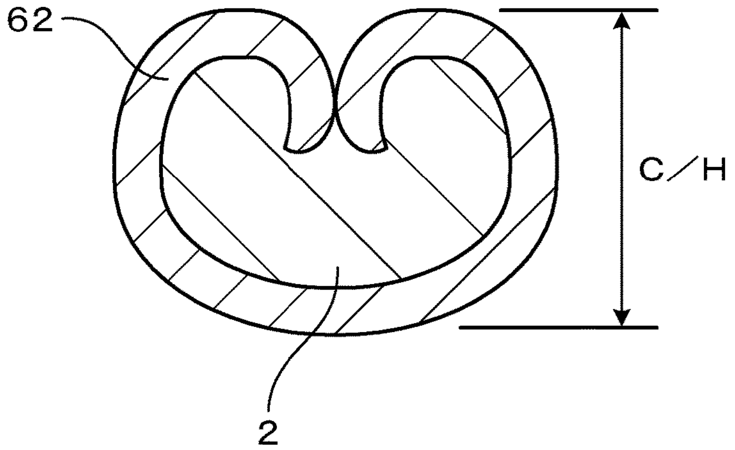
FIG. 4 is an illustration of a crimp height (C/H) when the terminal has been crimped in Example 1.

Next, a portion of the insulator 3 at one wire end portion of the automotive electric wire 5 was removed and a terminal 6 was crimped onto the exposed portion of the conductor (copper alloy stranded wire 2) as illustrated in FIG. 3. The terminal 6 includes a wire barrel 62 for securing the conductor of the automotive electric wire 5 and an insulation barrel 61 for securing the insulator 3. Crimping of the terminal 6 can be carried out by plastically deforming the barrels 61, 62 using a die (not illustrated) of a predetermined shape. In this example, as illustrated in FIG. 4, crimping of the terminal 6 was carried out under conditions that enable the resulting crimp height (C/H) to be 0.76 in each case.

In this example, evaluations of the properties of the resultant copper alloy stranded wires were made as follows. Firstly, a tensile test was conducted under conditions including a gauge length GL of 250 mm and a pulling rate of 50 mm/min to measure the tensile strength (MPa) and the total elongation (%). Also, the electrical resistance over a gauge length GL of 1000 mm was measured to calculate the electrical conductivity (% IACS). The obtained results are shown in Table 1.

Furthermore, the crimp strength of the automotive electric wire and a terminal was evaluated using the automotive electric wires onto which a terminal had been crimped. Specifically, the automotive electric wires were pulled at a pulling rate of 100 mm/min with a terminal secured thereto and the maximum load (N) up to which the terminal was not detached was measured to be designated as the crimp strength of each automotive electric wire and the terminal. The obtained results are shown in Table 2.

TABLE 1

| Sample | Chemical composition | | | | | | | | | | | |
|---|---|---|---|---|---|---|---|---|---|---|---|---|
| | mass % | | | | | | | | | | ppm (in mass ppm) | |
| No. | Cu | Fe | Ti | Sn | Ag | Mg | Zn | Cr | P | Additive element in total | H | O |
| sw1 | Bal. | — | — | — | — | 0.52 | — | — | 0.05 | 0.57 | 0.5 | 9 |
| sw2 | Bal. | — | — | — | — | 0.45 | — | — | 0.04 | 0.49 | 1 | 9 |
| sw3 | Bal. | 0.94 | 0.18 | — | — | 0.03 | — | — | — | 1.15 | 2 | 8 |
| sw4 | Bal. | 0.88 | 0.56 | — | — | 0.05 | — | — | — | 1.49 | 2 | 8 |
| sw5 | Bal. | 0.91 | 0.56 | — | — | 0.05 | — | — | — | 1.52 | 1.5 | 8 |
| sw6 | Bal. | — | — | 0.28 | 0.01 | — | 0.10 | 1.1 | — | 1.49 | 1.5 | 4 |
| sw7 | Bal. | 1.00 | 0.34 | — | — | 0.04 | — | — | — | 1.38 | 1 | 8 |
| sw101 | Bal. | 0.94 | 0.18 | — | — | 0.01 | — | — | — | 1.13 | 20 | 10 |
| sw102 | Bal. | 0.94 | 0.18 | — | — | 0.03 | — | — | — | 1.15 | 50 | 30 |

TABLE 1-continued

| Sample No. | Element wire diameter (mm) | Stranded wire cross-sectional area (mm$^2$) | Heat treatment Temperature (° C.) | Heat treatment Time | Property Tensile strength (MPa) | Property Total elongation (%) | Property Electrical conductivity (% IACS) |
|---|---|---|---|---|---|---|---|
| sw1 | 0.215 | 0.22 | 500 | 0.1 sec | 501 | 5 | 65 |
| sw2 | 0.160 | 0.13 | 300 | 8 h | 529 | 5 | 69 |
| sw3 | 0.160 | 0.13 | 450 | 8 h | 559 | 10 | 69 |
| sw4 | 0.160 | 0.13 | 450 | 4 h | 584 | 10 | 77 |
| sw5 | 0.160 | 0.13 | 450 | 8 h | 558 | 11 | 72 |
| sw6 | 0.160 | 0.13 | 370 | 4 h | 550 | 11 | 76 |
| sw7 | 0.160 | 0.13 | 450 | 8 h | 575 | 10 | 75 |
| sw101 | 0.160 | 0.13 | 450 | 8 h | 525 | 10 | 67 |
| sw102 | Working was impossible | | | | | | |

TABLE 2

| Sample No. | Conductor | Insulator Material | Insulator Thickness (mm) | Crimp strength (N) |
|---|---|---|---|---|
| 1-1 | sw1 | PVC | 0.2 | 90 |
| 1-2 | sw2 | PVC | 0.2 | 55 |
| 1-3 | sw3 | PVC | 0.2 | 62 |
| 1-4 | sw4 | PVC | 0.2 | 66 |
| 1-5 | sw5 | PVC | 0.2 | 62 |
| 1-6 | sw6 | PVC | 0.2 | 62 |
| 1-7 | sw7 | PVC | 0.2 | 64 |
| 1-101 | sw101 | PVC | 0.2 | 45 |

The results in Table 1 confirm that the copper alloy stranded wires of samples sw1 to sw7 have high strength and high elongations, with the tensile strengths of not less than 400 MPa, or more specifically the tensile strengths of not less than 500 MPa together with the total elongations of not less than 5%. Moreover, the results also confirm that, although the copper alloy stranded wires of samples sw 1 to sw 7 have high strength, they exhibit electrical conductivities of not less than 62% IACS and therefore that their strengths are increased without compromising the electrical conductivities.

Furthermore, the results in Table 2 confirm that the automotive electric wires of samples 1-1 to 1-7 exhibit high crimp strengths when a terminal is crimped onto the wire end portion, with the crimp strengths of the automotive electric wire and the terminal of not less than 51 N. This was achieved by limiting the H content in the copper alloy element wires, which constitute the conductor, to be within the specified range as shown in Table 1 to thereby enable a reduction in H-induced intergranular cracking.

In contrast, the automotive electric wire of sample 1-101 exhibited a decreased crimp strength of the automotive electric wire and the terminal compared with the other samples. This is due to the fact that the H content in the copper alloy element wires, which constitute the conductor, exceeded the specified range as shown in Table 1 and this resulted in great influence of H-induced intergranular cracking.

Example 2

Examples of the copper alloy element wire will be described together with comparative examples.

In this example, copper alloy element wires having the chemical compositions shown in Table 3 were produced and evaluated. The copper alloy element wires of samples w1 to w7 each can be formed into a copper alloy stranded wire for use by twisting together a plurality of the copper alloy element wires. The copper alloy stranded wires can be used as a conductor of an automotive electric wire. The copper alloy element wires of samples w1 to w7 each had a chemical composition including: 0.45 mass % or more and 2.0 mass % or less, in total, of at least one additive element selected from the group consisting of Fe, Ti, Sn, Ag, Mg, Zn, Cr and P; in mass ppm, 10 ppm or less of H content, and the balance being Cu and unavoidable impurities.

On the other hand, a copper alloy element wire of sample w101, which was prepared as a comparative example, had a chemical composition in which the H content was more than 10 ppm in mass ppm.

Specifically, the copper alloy element wires were produced in the following manner. Electrolytic copper of 99.99% or more purity and a parent alloy including copper and additive elements and in which the H content was appropriately reduced were loaded into a high-purity carbon crucible and subjected to vacuum melting in a continuous casting machine. Thus, molten mixed metals having the chemical compositions shown in Table 3 were produced. Thereafter, the resultant molten mixed metals were continuously cast using a high-purity carbon mold to produce cast materials having a circular cross sectional shape with a diameter of 16 mm.

Then, the resultant cast materials were swaged to a diameter of 12 mm to form wrought products. In this example, the swaged wrought products were subjected to a solution treatment under conditions including a holding temperature of 950° C. and a holding time of 1 hour. Subsequently, the resultant wrought products were subjected to wire drawing to a diameter of 0.215 mm or a diameter of 0.16 mm and then to heat treatment under conditions shown in Table 3. In this manner, the copper alloy element wires of samples w1 to w7 and sample w101 were produced. A sample w102 contained an excessively high amount of H content and thus could not be subjected to working after casting.

In this example, evaluations of the properties of the resultant copper alloy element wires were made as follows. Firstly, a tensile test was conducted under conditions including a gauge length GL of 250 mm and a pulling rate of 50 mm/min to measure the tensile strength (MPa) and the element wire elongation (%). Also, the electrical resistance over a gauge length GL of 1000 mm was measured to calculate the electrical conductivity (% IACS). The obtained results are shown in Table 3.

TABLE 3

| Sample No. | Chemical composition mass % Cu | Fe | Ti | Sn | Ag | Mg | Zn | Cr | P | 添加元素合計 | ppm (in mass ppm) H | O |
|---|---|---|---|---|---|---|---|---|---|---|---|---|
| w1 | Bal. | — | — | — | — | 0.52 | — | — | 0.05 | 0.57 | 0.5 | 9 |
| w2 | Bal. | — | — | — | — | 0.45 | — | — | 0.04 | 0.49 | 1 | 9 |
| w3 | Bal. | 0.94 | 0.18 | — | — | 0.03 | — | — | — | 1.15 | 2 | 8 |
| w4 | Bal. | 0.88 | 0.56 | — | — | 0.05 | — | — | — | 1.49 | 2 | 8 |
| w5 | Bal. | 0.91 | 0.56 | — | — | 0.05 | — | — | — | 1.52 | 1.5 | 8 |
| w6 | Bal. | — | — | 0.28 | 0.01 | — | 0.10 | 1.1 | — | 1.49 | 1.5 | 4 |
| w7 | Bal. | 1.00 | 0.34 | — | — | 0.04 | — | — | — | 1.38 | 1 | 8 |
| w101 | Bal. | 0.94 | 0.18 | — | — | 0.01 | — | — | — | 1.13 | 20 | 10 |
| w102 | Bal. | 0.94 | 0.18 | — | — | 0.03 | — | — | — | 1.15 | 50 | 30 |

| Sample No. | Element wire diameter (mm) | Heat treatment Temperature (° C.) | Heat treatment Time | Property Tensile strength (MPa) | Property Element wire elongation (%) | Property Electrical conductivity (% IACS) |
|---|---|---|---|---|---|---|
| w1 | 0.215 | 500 | 0.1 sec | 511 | 5 | 66 |
| w2 | 0.160 | 300 | 8 h | 539 | 5 | 70 |
| w3 | 0.160 | 450 | 8 h | 570 | 8 | 70 |
| w4 | 0.160 | 450 | 4 h | 589 | 8 | 78 |
| w5 | 0.160 | 450 | 8 h | 569 | 10 | 73 |
| w6 | 0.160 | 370 | 4 h | 561 | 10 | 77 |
| w7 | 0.160 | 450 | 8 h | 586 | 9 | 76 |
| w101 | 0.160 | 450 | 8 h | 535 | 8 | 68 |
| w102 | Working was impossible | | | | | |

The results in Table 3 confirm that the copper alloy element wires of samples w1 to w7 have high strength and high elongations, with the tensile strengths of not less than 400 MPa, or more specifically the tensile strengths of not less than 500 MPa together with the element wire elongations of not less than 5%. Moreover, the results also confirm that, although the copper alloy element wires of samples w1 to w7 have high strength, they exhibit electrical conductivities of not less than 62% IACS and therefore that their strengths are increased without compromising the electrical conductivity properties. These results demonstrate that the copper alloy stranded wires including the respective copper alloy element wires are each capable of exhibiting high conductor strength as a conductor of an automotive electric wire.

Next, seven copper alloy element wires of each sample were twisted together at a twist pitch of 16 mm to form stranded wires. The stranded wires were then subjected to circular compression in a radial direction of the stranded wires to produce copper alloy stranded wires. As with Example 1, automotive electric wires were produced using the resultant copper alloy stranded wires and the crimp strengths of the automotive electric wire and the terminal were measured. As a result, it has been found that automotive electric wires including the respective copper alloy stranded wires formed of the respective copper alloy element wires of samples w1 to w7 each exhibited a crimp strength of the automotive electric wire and the terminal of not less than 51 N and thus have high crimp strength. As with Example 1, this was achieved by limiting the H content in the copper alloy element wires, which constitute the copper alloy stranded wire, to be within the specified range to thereby enable a reduction in H-induced intergranular cracking.

In contrast, the automotive electric wire including a copper alloy stranded wire formed of the copper alloy element wires of sample w101 exhibited a reduced crimp strength of the automotive electric wire and the terminal of less than 51 N as with Example 1. This is due to the fact that the H content in the copper alloy element wires, which constitute the copper alloy stranded wire, exceeded the specified range as shown in Table 3 and this resulted in great influence of H-induced intergranular cracking.

Although the examples of the present invention have been described in detail in the foregoing descriptions, the present invention is not limited to the examples and various modifications may be made without departing from the scope of the invention.

The invention claimed is:

1. A copper alloy element wire for use as a conductor of an automotive electric wire, the copper alloy element wire having a chemical composition consisting of:

0.45 mass % or more and 2.0 mass % or less of Fe, Ti and Mg in total;

in mass ppm, 10 ppm or less of H content; and the balance being Cu and unavoidable impurities.

2. The copper alloy element wire according to claim 1, wherein an O content in the chemical composition is 20 ppm or less in mass ppm.

3. The copper alloy element wire according to claim 1, wherein a tensile strength of the copper alloy element wire is 400 MPa or more.

4. The copper alloy element wire according to claim 1, wherein an element wire elongation of the copper alloy element wire is 5% or more.

5. The copper alloy element wire according to claim 1, wherein an electrical conductivity of the copper alloy element wire is 62% IACS or more.

6. The copper alloy element wire according to claim 1, wherein an element wire diameter of the copper alloy element wire is 0.3 mm or less.

7. A copper alloy stranded wire comprising a plurality of the copper alloy element wires according to claim 1, the plurality of the copper alloy element wires being twisted together.

8. The copper alloy stranded wire according to claim 7, wherein the copper alloy stranded wire is compressed in a radial direction of the stranded wire.

9. The copper alloy stranded wire according to claim 7, wherein a stranded wire cross-sectional area of the copper alloy stranded wire is 0.22 $mm^2$ or less.

10. The copper alloy stranded wire according to claim 7, wherein a tensile strength of the copper alloy stranded wire is 400 MPa or more.

11. The copper alloy stranded wire according to claim 7, wherein a total elongation of the copper alloy stranded wire is 5% or more.

12. The copper alloy stranded wire according to claim 7, wherein an electrical conductivity of the copper alloy stranded wire is 62% IACS or more.

13. An automotive electric wire comprising:

the copper alloy stranded wire according to claim 7; and an insulator that covers an outer periphery of the copper alloy stranded wire.

14. The automotive electric wire according to claim 13, comprising a terminal crimped onto a wire end portion of the automotive electric wire.

15. The automotive electric wire according to claim 14, wherein a crimp strength of the automotive electric wire and the terminal is 51 N or more.

16. The copper alloy element wire according to claim 2, wherein a tensile strength of the copper alloy element wire is 400 MPa or more.

17. The copper alloy element wire according claim 16, wherein an element wire elongation of the copper alloy element wire is 5% or more.

18. The copper alloy element wire according to claim 17, wherein an electrical conductivity of the copper alloy element wire is 62% IACS or more.

19. The copper alloy element wire according to claim 18, wherein an element wire diameter of the copper alloy element wire is 0.3 mm or less.

20. A copper alloy stranded wire comprising a plurality of the copper alloy element wires according to claim 19, the plurality of the copper alloy element wires being twisted together.

* * * * *